United States Patent
Zacharias et al.

(10) Patent No.: US 11,184,917 B2
(45) Date of Patent: Nov. 23, 2021

(54) MANAGING CONCURRENT MULTI-RAT UPLINK TRANSMISSIONS AT A USER EQUIPMENT

(71) Applicant: QUALCOMM Incorporated, San Diego, CA (US)

(72) Inventors: Leena Zacharias, San Jose, CA (US); Reza Shahidi, San Diego, CA (US); Amir Aminzadeh Gohari, Sunnyvale, CA (US); Arnaud Meylan, San Diego, CA (US); Liang Zhao, Saratoga, CA (US); Dinesh Kumar Devineni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 16/810,383

(22) Filed: Mar. 5, 2020

(65) Prior Publication Data
US 2021/0022171 A1    Jan. 21, 2021

Related U.S. Application Data

(60) Provisional application No. 62/876,439, filed on Jul. 19, 2019.

(51) Int. Cl.
*H04W 72/14* (2009.01)
*H04L 5/14* (2006.01)
(Continued)

(52) U.S. Cl.
CPC ............ *H04W 72/14* (2013.01); *G01S 19/12* (2013.01); *H04L 5/1469* (2013.01);
(Continued)

(58) Field of Classification Search
None
See application file for complete search history.

(56) References Cited

U.S. PATENT DOCUMENTS

| 10,244,527 B2 | 3/2019 | Zacharias et al. |
| 2018/0035444 A1 | 2/2018 | Wu et al. |

(Continued)

FOREIGN PATENT DOCUMENTS

| CN | 109151931 A | 1/2019 |
| EP | 3030040 A1 | 6/2016 |

(Continued)

OTHER PUBLICATIONS

International Search Report and Written Opinion—PCT/US2020/034703—ISA/EPO—dated Nov. 26, 2020.
(Continued)

*Primary Examiner* — Hong S Cho
(74) *Attorney, Agent, or Firm* — QUALCOMM Incorporated

(57) ABSTRACT

In an embodiment, a UE receives a first uplink grant for a first RAT (e.g., 5G NR) and a second uplink grant for a second RAT (e.g., LTE). In one embodiment, the UE schedules an uplink transmission on the first RAT (e.g., by selectively dropping the uplink transmission on particular resource blocks) so as to manage an amount of time that is based on concurrent uplink transmissions on both the first and second RATs are performed. In another embodiment, the UE establishes a first period of time where a BSR transmitted by the UE on the first RAT is adjusted based on scheduling of concurrent uplink multi-RAT transmissions, and a second period of time where no BSR is transmitted by the UE on the first RAT based where concurrent uplink transmissions on both the first and second RATs are not permitted to be scheduled.

30 Claims, 14 Drawing Sheets

(51) Int. Cl.
   *H04W 28/02*    (2009.01)
   *H04W 72/04*    (2009.01)
   *H04W 72/12*    (2009.01)
   *H04W 88/06*    (2009.01)
   *G01S 19/12*    (2010.01)
(52) U.S. Cl.
   CPC ... *H04W 28/0278* (2013.01); *H04W 72/0413* (2013.01); *H04W 72/0446* (2013.01)

(56) References Cited

U.S. PATENT DOCUMENTS

2018/0049208 A1* 2/2018 Ozturk .................. H04L 45/245
2018/0368199 A1 12/2018 Zeng et al.
2020/0045761 A1 2/2020 Zeng et al.
2020/0245257 A1* 7/2020 Pelletier .............. H04W 52/365

FOREIGN PATENT DOCUMENTS

WO    2015077971 A1    6/2015
WO    2015116866 A1    8/2015

OTHER PUBLICATIONS

Partial International Search Report—PCT/US2020/034703—ISA/EPO—dated Sep. 14, 2020.

* cited by examiner

MANAGING CONCURRENT MULTI-RAT UPLINK TRANSMISSIONS AT A USER EQUIPMENT

CROSS-REFERENCE TO RELATED APPLICATIONS

The present Application for Patent claims the benefit of Provisional Patent Application No. 62/876,439 entitled "MANAGING CONCURRENT MULTI-RAT UPLINK TRANSMISSIONS AT A USER EQUIPMENT" filed Jul. 19, 2019, and assigned to the assignee hereof and hereby expressly incorporated herein by reference in its entirety.

TECHNICAL FIELD

Various aspects described herein generally relate to managing concurrent multi-RAT uplink transmissions at a user equipment.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

SUMMARY

An embodiment is directed to a method of operating a user equipment (UE), comprising receiving a first uplink grant for a first radio access technology (RAT), receiving a second uplink grant for a second RAT, determining an amount of time, over a window of time, that is based on concurrent uplink transmissions on both the first and second RATs are performed, determining that the amount of time will exceed a time threshold if an uplink transmission is performed on the first RAT, and scheduling the uplink transmission on the first RAT based on the amount of time so as to maintain the amount of time where concurrent uplink transmissions on both the first and second RATs are performed to be less than or equal to the time threshold.

Another embodiment is directed to a method of operating a user equipment (UE), comprising receiving a first uplink grant for a first radio access technology (RAT), receiving a second uplink grant for a second RAT, and establishing a first period of time where a buffer status report (BSR) transmitted by the UE on the first RAT is adjusted to reflect an amount of data that can be drained in an amount of time where concurrent uplink transmissions on both the first and second RATs are permitted to be scheduled, and establishing a second period of time where no BSR is transmitted by the UE on the first RAT based on a time threshold associated with an amount of time where concurrent uplink transmissions on both the first and second RATs are not permitted to be scheduled Another embodiment is directed to a user equipment (UE), comprising a memory, at least one transceiver, and at least one processor coupled to the memory and the at least one transceiver and configured to receive a first uplink grant for a first radio access technology (RAT), receive a second uplink grant for a second RAT, determine an amount of time, over a window of time, that is based on concurrent uplink transmissions on both the first and second RATs are performed, determine that the amount of time will exceed a time threshold if an uplink transmission is performed on the first RAT, and schedule the uplink transmission on the first RAT based on the amount of time so as to maintain the amount of time where concurrent uplink transmissions on both the first and second RATs are performed to be less than or equal to the time threshold.

Another embodiment is directed to a user equipment (UE), comprising a memory, at least one transceiver, and at least one processor coupled to the memory and the at least one transceiver and configured to receive a first uplink grant for a first radio access technology (RAT), receive a second uplink grant for a second RAT, establish a first period of time where a buffer status report (BSR) transmitted by the UE on the first RAT is adjusted to reflect an amount of data that can be drained in an amount of time where concurrent uplink transmissions on both the first and second RATs are permitted to be scheduled, and establish a second period of time where no BSR is transmitted by the UE on the first RAT based on a time threshold associated with an amount of time where concurrent uplink transmissions on both the first and second RATs are not permitted to be scheduled.

Another embodiment is directed to a user equipment (UE), comprising means for receiving a first uplink grant for a first radio access technology (RAT), means for receiving a second uplink grant for a second RAT, means for determining an amount of time, over a window of time, that is based on concurrent uplink transmissions on both the first and second RATs are performed, means for determining that the amount of time will exceed a time threshold if an uplink transmission is performed on the first RAT, and means for scheduling the uplink transmission on the first RAT based on the amount of time so as to maintain the amount of time where concurrent uplink transmissions on both the first and second RATs are performed to be less than or equal to the time threshold.

Another embodiment is directed to a user equipment (UE), comprising means for receiving a first uplink grant for a first radio access technology (RAT), means for receiving a second uplink grant for a second RAT, means for establishing a first period of time where a buffer status report (BSR) transmitted by the UE on the first RAT is adjusted to reflect an amount of data that can be drained in an amount of time where concurrent uplink transmissions on both the first and second RATs are permitted to be scheduled, and means for establishing a second period of time where no BSR is transmitted by the UE on the first RAT based on a time threshold associated with an amount of time where concurrent uplink transmissions on both the first and second RATs are not permitted to be scheduled.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
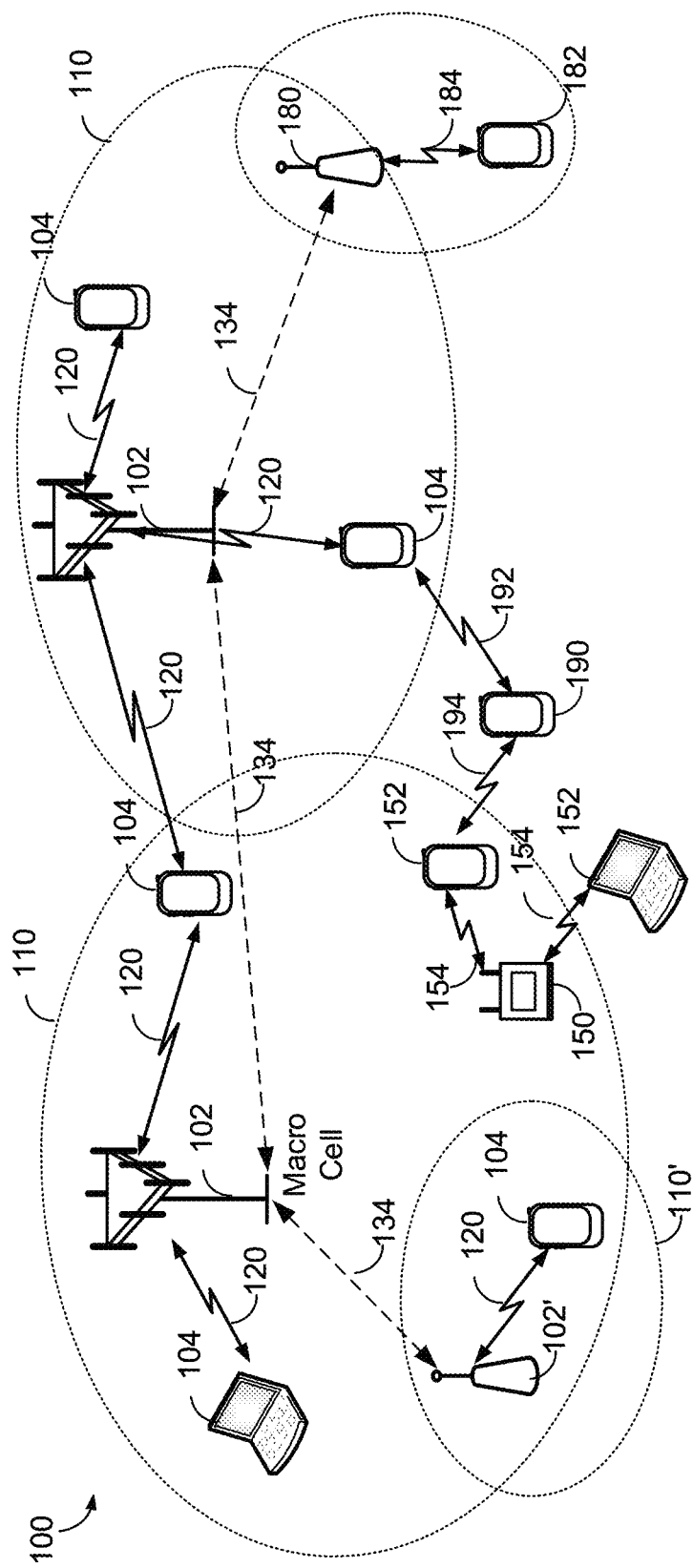
FIG. 1 illustrates an exemplary wireless communications system, according to various aspects.

Various aspects described herein generally relate to managing concurrent multi-RAT uplink transmissions at a user equipment.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC)

cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
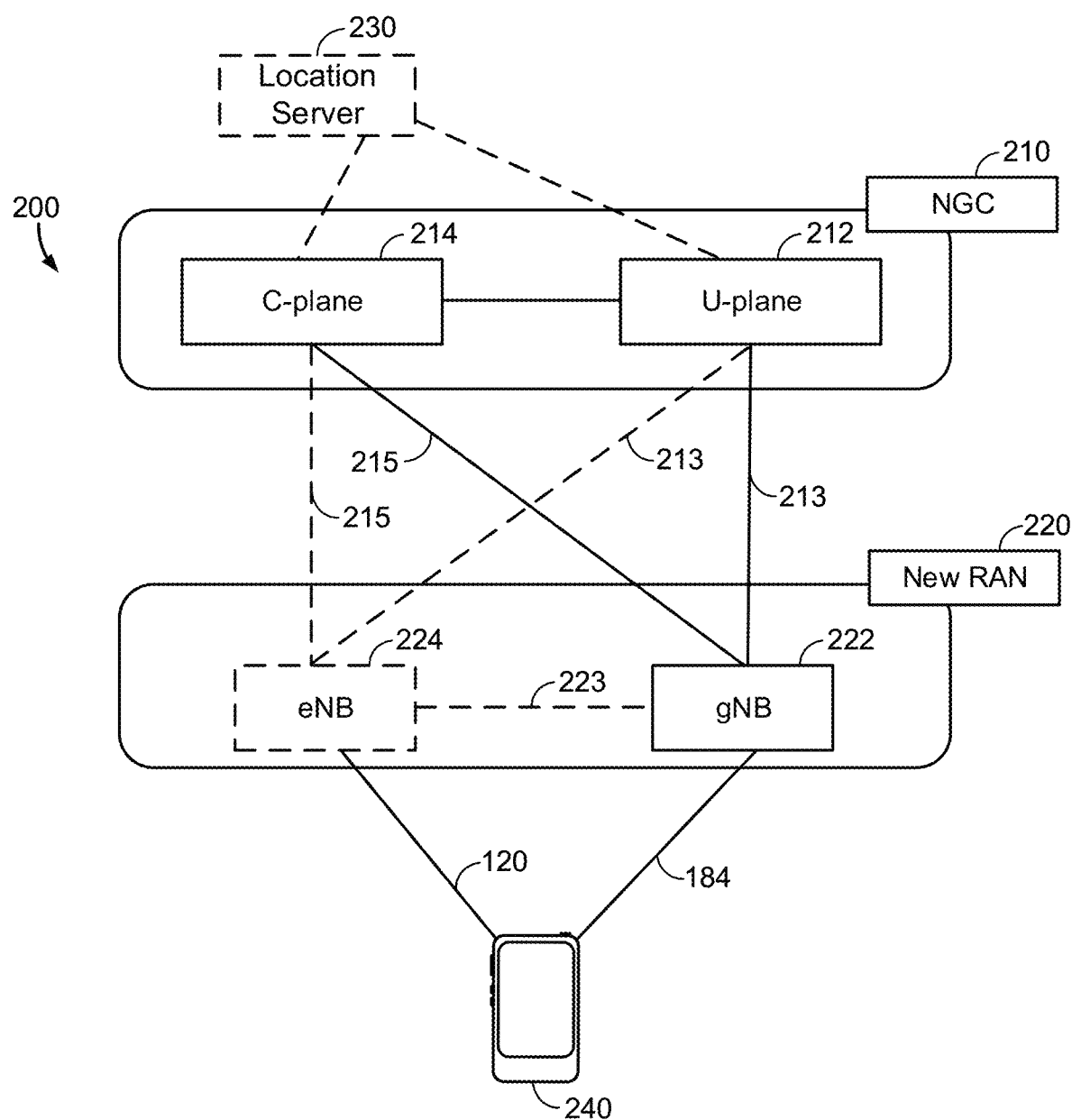
FIGS. 2A and 2B illustrate example wireless network structures, according to various aspects.

According to various aspects, FIG. 2A illustrates an example wireless network structure 200. For example, an NGC 210 can be viewed functionally as control plane functions 214 (e.g., UE registration, authentication, network access, gateway selection, etc.), and user plane functions 212 (e.g., UE gateway function, access to data networks, Internet protocol (IP) routing, etc.), which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 152, UE 182, UE 190, etc.). Another optional aspect may include a location server 230 that may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
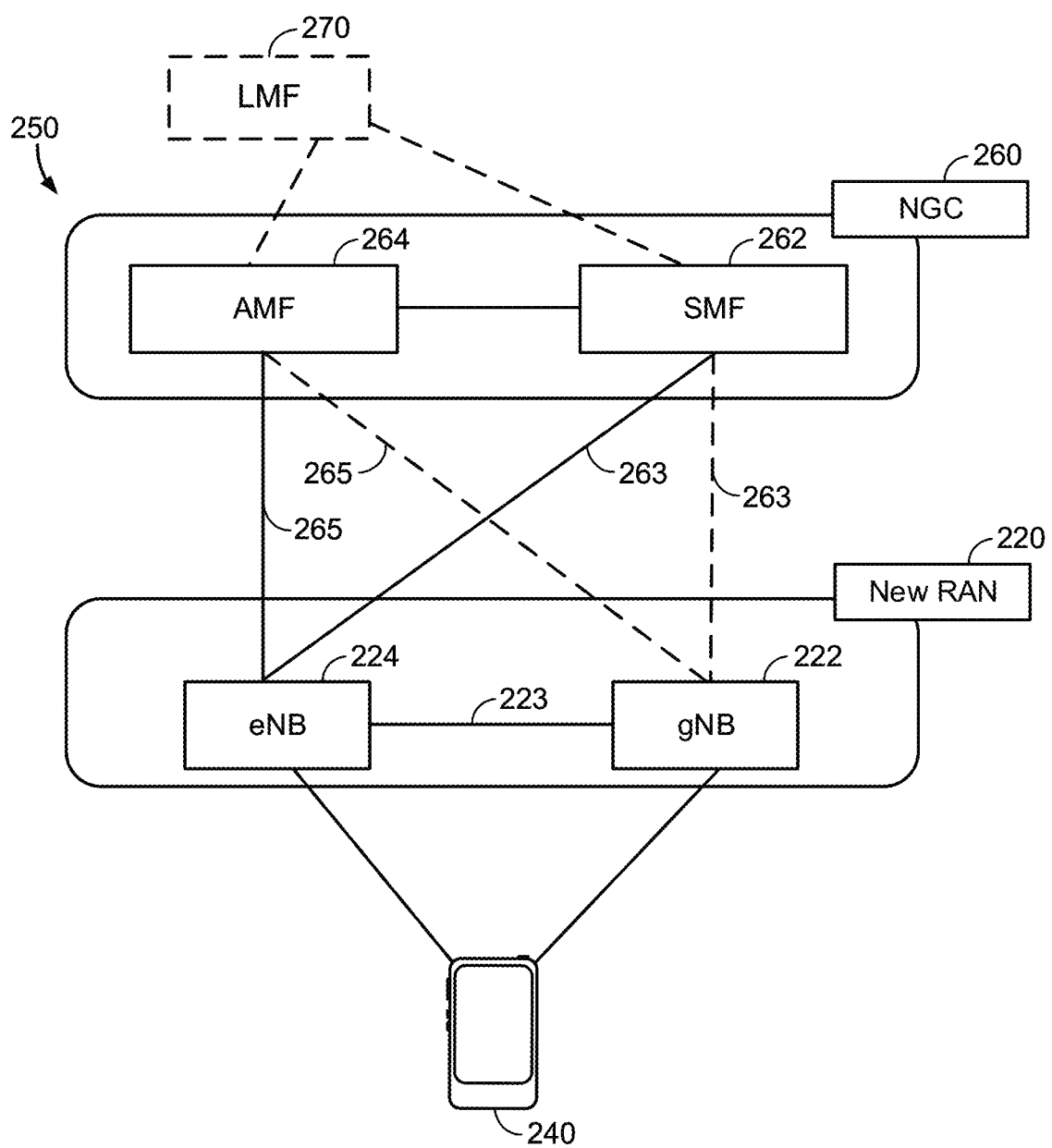

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 240. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 240 that can connect to the LMF 270 via the core network, NGC 260, and/or via the Internet (not illustrated).

Figure 3A:
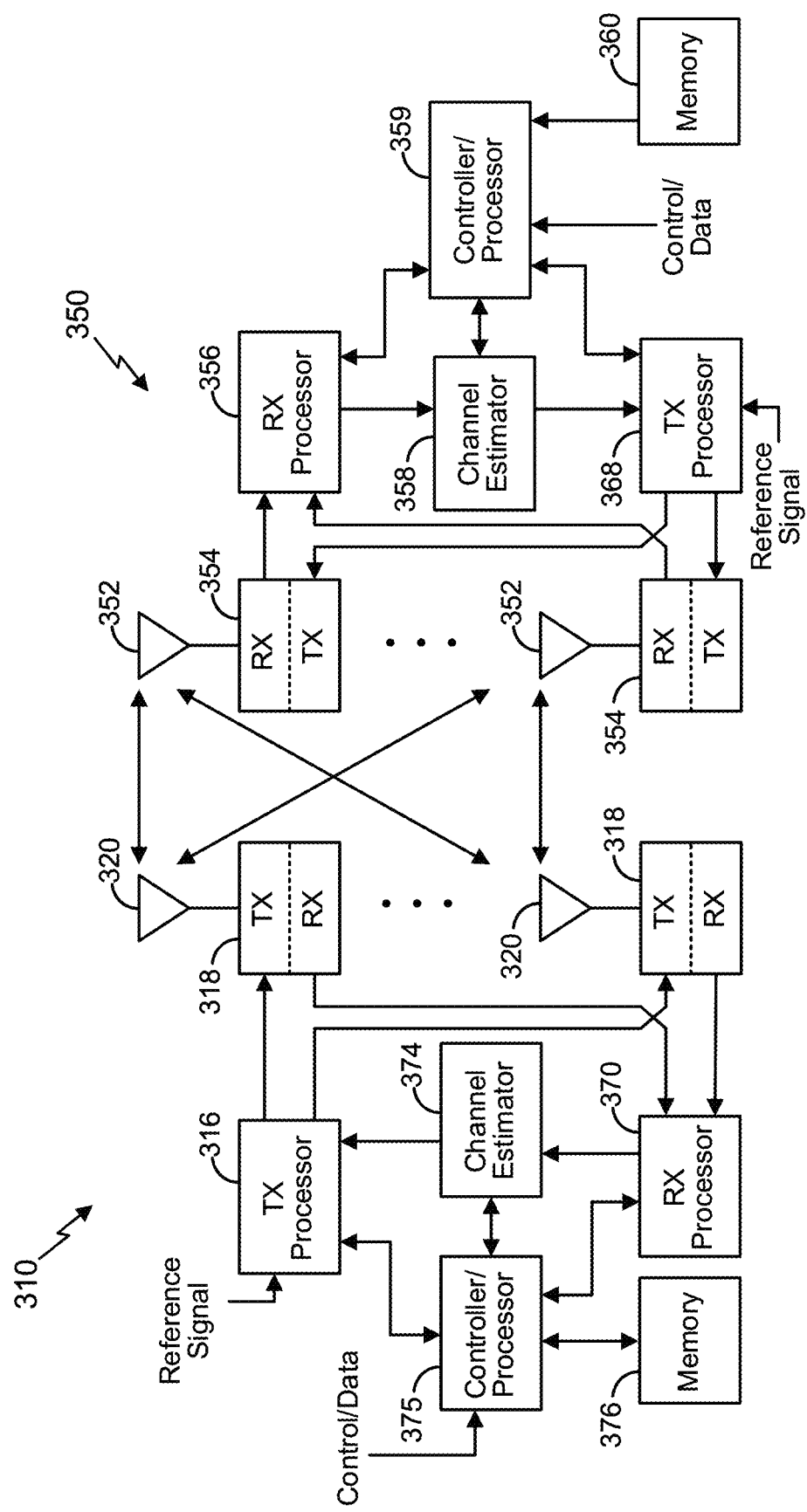
FIG. 3A illustrates an exemplary base station and an exemplary user equipment (UE) in an access network, according to various aspects.

According to various aspects, FIG. 3A illustrates an exemplary base station (BS) 310 (e.g., an eNB, a gNB, a small cell AP, a WLAN AP, etc.) in communication with an exemplary UE 350 (e.g., any of the UEs depicted in FIG. 1, such as UEs 104, UE 152, UE 182, UE 190, etc.) in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., master information block (MIB), system information blocks (SIGs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the processing system 359, which implements Layer-3 and Layer-2 functionality.

The processing system 359 can be associated with a memory 360 that stores program codes and data. The memory 360 may be referred to as a non-transitory computer-readable medium. In the UL, the processing system 359 provides demultiplexing between transport and logical channels, packet reassembly, deciphering, header decompression, and control signal processing to recover IP packets from the core network. The processing system 359 is also responsible for error detection.

Similar to the functionality described in connection with the DL transmission by the base station 310, the processing system 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission. In an aspect, the transmitters 354b and the receivers 354a may be one or more transceivers, one or more discrete transmitters, one or more discrete receivers, or any combination thereof.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to a RX processor 370. In an aspect, the transmitters 318a and the receivers 318b may be one or more transceivers, one or more discrete transmitters, one or more discrete receivers, or any combination thereof.

The processing system 375 can be associated with a memory 376 that stores program codes and data. The memory 376 may be referred to as a non-transitory computer-readable medium. In the UL, the processing system 375 provides demultiplexing between transport and logical channels, packet reassembly, deciphering, header decompression, control signal processing to recover IP packets from the UE 350. IP packets from the processing system 375 may be provided to the core network. The processing system 375 is also responsible for error detection.

Figure 3B:
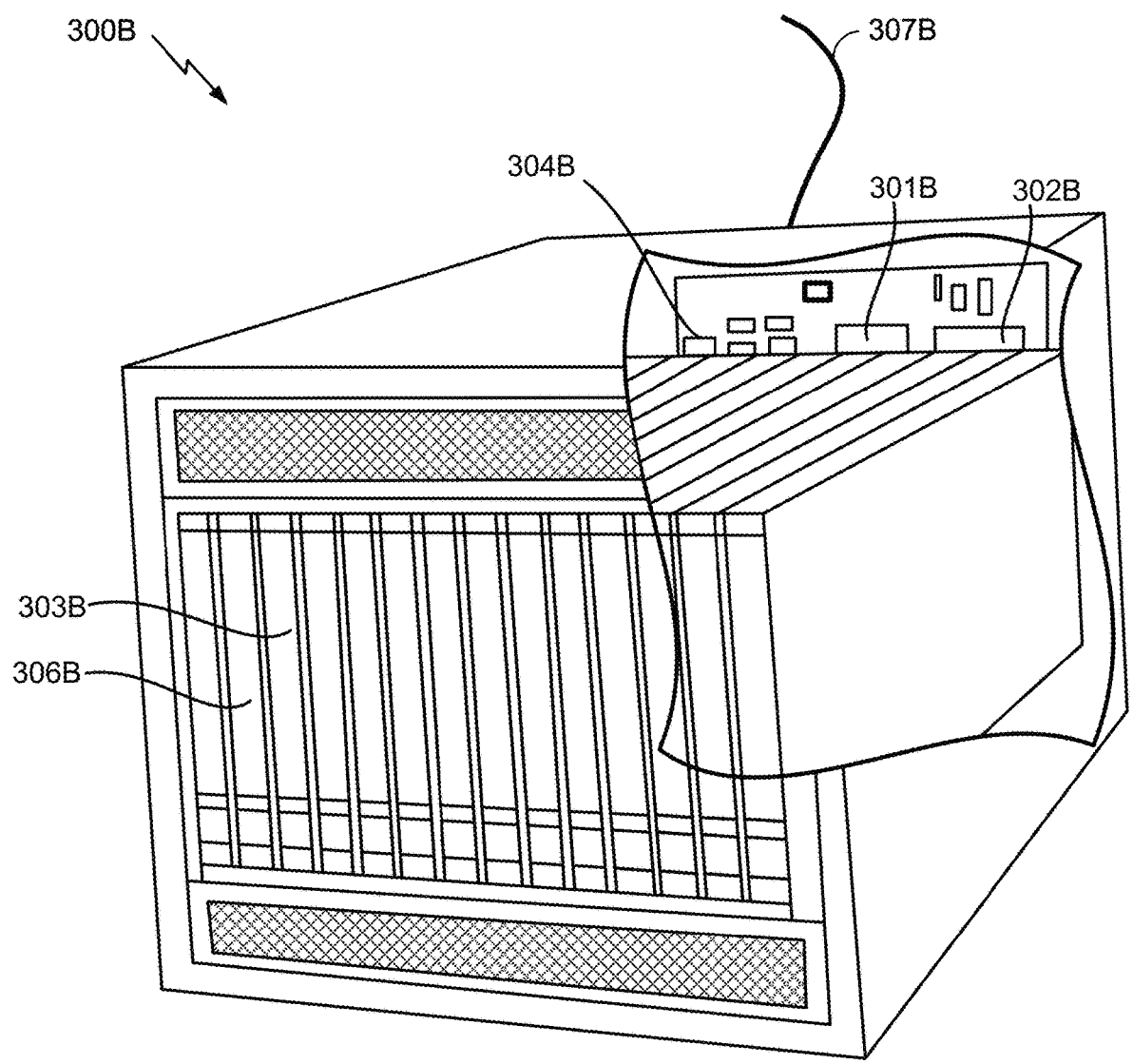
FIG. 3B illustrates an exemplary server according to various aspects.

FIG. 3B illustrates an exemplary server 300B. In an example, the server 300B may correspond to one example configuration of the location server 230 described above. In FIG. 3B, the server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4:
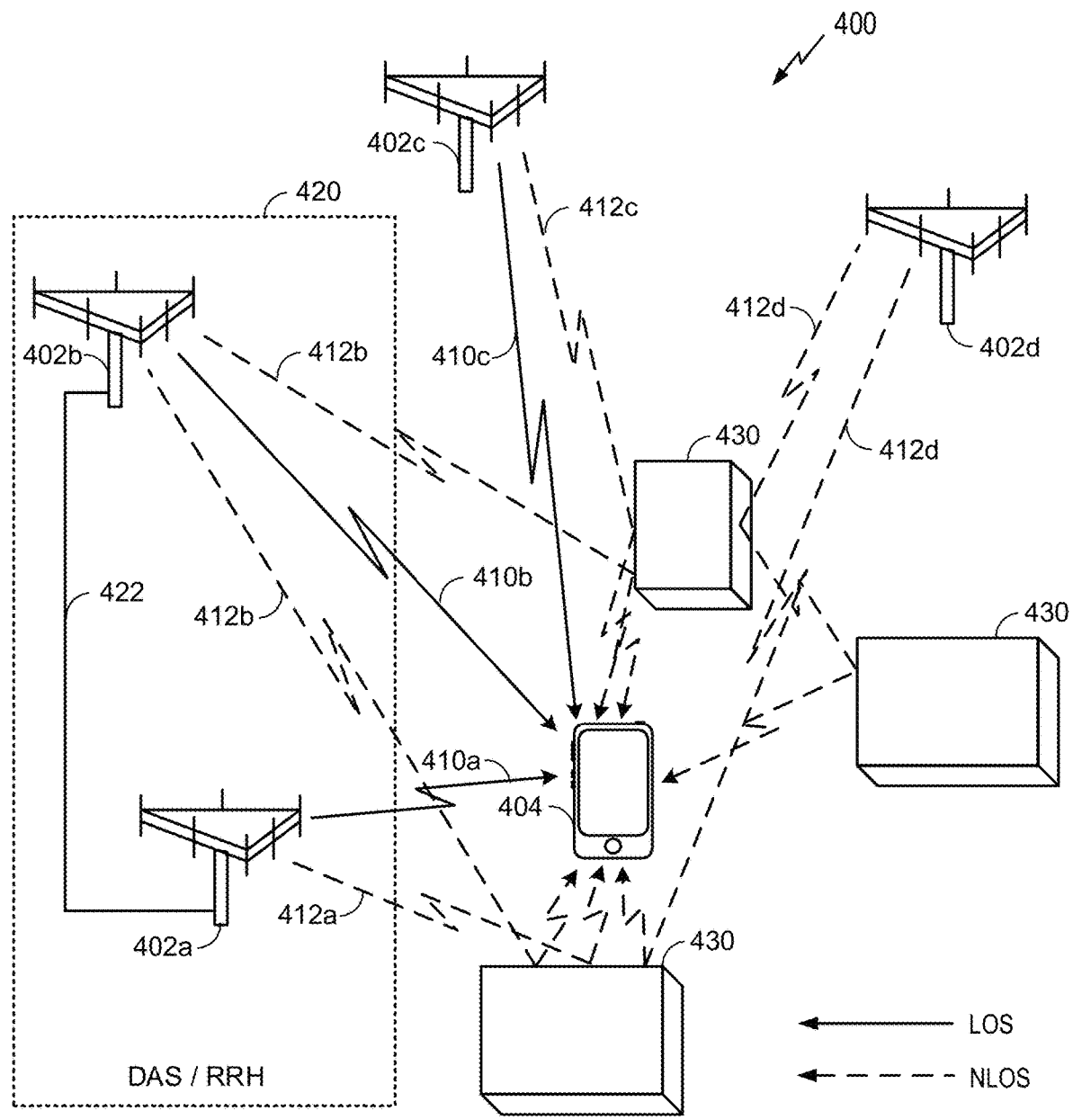
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

Concurrent uplink transmissions by UEs via multiple RATs (e.g., LTE and 5G NR via E-UTRAN New Radio—Dual Connectivity or EN-DC mode, or other types of dual connectivity modes such as NR-NR NR-LTE, etc.) on particular band combinations may cause interference (e.g., intermodulation or IM) on satellite bands, such as Global Navigation Satellite System (GNSS) bands. For example, for any allocated subcarrier frequencies f1 and f2, uplink transmissions may cause intermodulation interference if the following conditions are satisfied:

$$(m1 \times f1 + m2 \times f2 > \text{victimFreqStart} - \text{freqMargin}) \text{ AND}$$

$$(m1 \times f1 + f2 \times g2 > \text{victimFreqStop} + \text{freqMargin})$$

whereby f1 may represent a first subcarrier frequency of a first resource block allocated for uplink transmission on a first RAT (e.g., 5G NR, including frequency division duplex (FDD) NR and/or time division duplex (TDD) NR), f2 may represent a second subcarrier frequency of a second resource block allocated for uplink transmission on a second RAT (e.g., LTE), m1 may represent a first intermodulation coefficient, and m2 may represent a second intermodulation coefficient. Further, victimFreqStart may represent a lower frequency boundary of an RF spectrum band that may be subject to intermodulation interference (e.g., a GNSS spectrum band), victimFreqStop may represent an upper frequency boundary of the RF spectrum band that may be subject to intermodulation interference, and freqMargin may represent a configurable frequency margin value (e.g., 2 MHz, or the like).

In some aspects, an RF spectrum band (e.g., GNSS band) may be associated with an interference requirement, such as a requirement that a threshold number of at least 50% "IM free" time across a particular window of time (e.g., 20 ms window). In scenarios where concurrent uplink transmissions on multiple RATs causes IM on such bands, this means that concurrent uplink transmissions on these RATs is limited to no more than 50% of any particular window of tie (e.g., no more than 10 ms per 20 ms window). Below, Table 1 indicates particular GNSS bands that may be subjected to IM from particular EN-DC band combinations when used for uplink transmissions by a particular UE:

TABLE 1

Victim GNSS Bands for 5G NR + LTE Concurrent Uplink Transmissions

| Name | GPS-E1 | GAL-L1 | GLO-G1 | BDS-B1 | GPS-L2 | GPS-L5/GAL E5a | GLO-G2 | BDS-B2 | NAV-N1 |
|---|---|---|---|---|---|---|---|---|---|
| 1A-n3A | Y(3) | Y(3) | Y(3) | Y(3) | | | | | |
| 1A-n8A | Y(3) | Y(3) | Y(3) | Y(3) | | | | | |
| 1A-n28A | | | | | Y(2) | Y(2) | Y(2) | Y(2) | Y(2) |
| 2A-n5A | | | | | Y(3) | Y(3) | Y(3) | Y(3) | |
| 2A-n66A | Y(3) | Y(3) | Y(3) | Y(3) | Y(2) | Y(2) | | Y(2) | Y(2) |
| 2A-n71A | | | | | Y(2) | Y(2) | Y(2) | Y(2) | Y(2) |
| 3A-n1A | Y(3) | Y(3) | Y(3) | Y(3) | | | | | |
| 3A-n8A | | | | | Y(3) | Y(3) | Y(3) | Y(3) | Y(3) |
| 7A-n8A | | Y(2) | | | | | | | |
| 12A-n2A | | | | | | Y(2) | | Y(2) | Y(2) |
| 20A-n1A | Y(3) | Y(3) | Y(3) | Y(3) | | Y(3) | | Y(3) | Y(3) |
| 20A-n28A | Y(2) | Y(2) | Y(2) | Y(2) | | | | | |
| 25A-n41A | | | | | Y(3) | Y(3) | Y(3) | Y(3) | Y(3) |
| 30A-n66A | | | | | Y(3) | Y(3) | Y(3) | Y(3) | Y(3) |
| 66A-n2A | Y(3) | Y(3) | Y(3) | Y(3) | Y(2) | Y(2) | | Y(2) | Y(2) |
| 66A-n66A | | | | | | | Y(2) | | |
| 71A-n2A | | | | | Y(2) | Y(2) | Y(2) | Y(2) | Y(2) |

In Table 1, Y(2) indicates the presence of $2^{nd}$ order IM to a victim GNSS band, and Y(3) indicates the presence of $3^{rd}$ order IM to a victim GNSS band.

Figure 5:
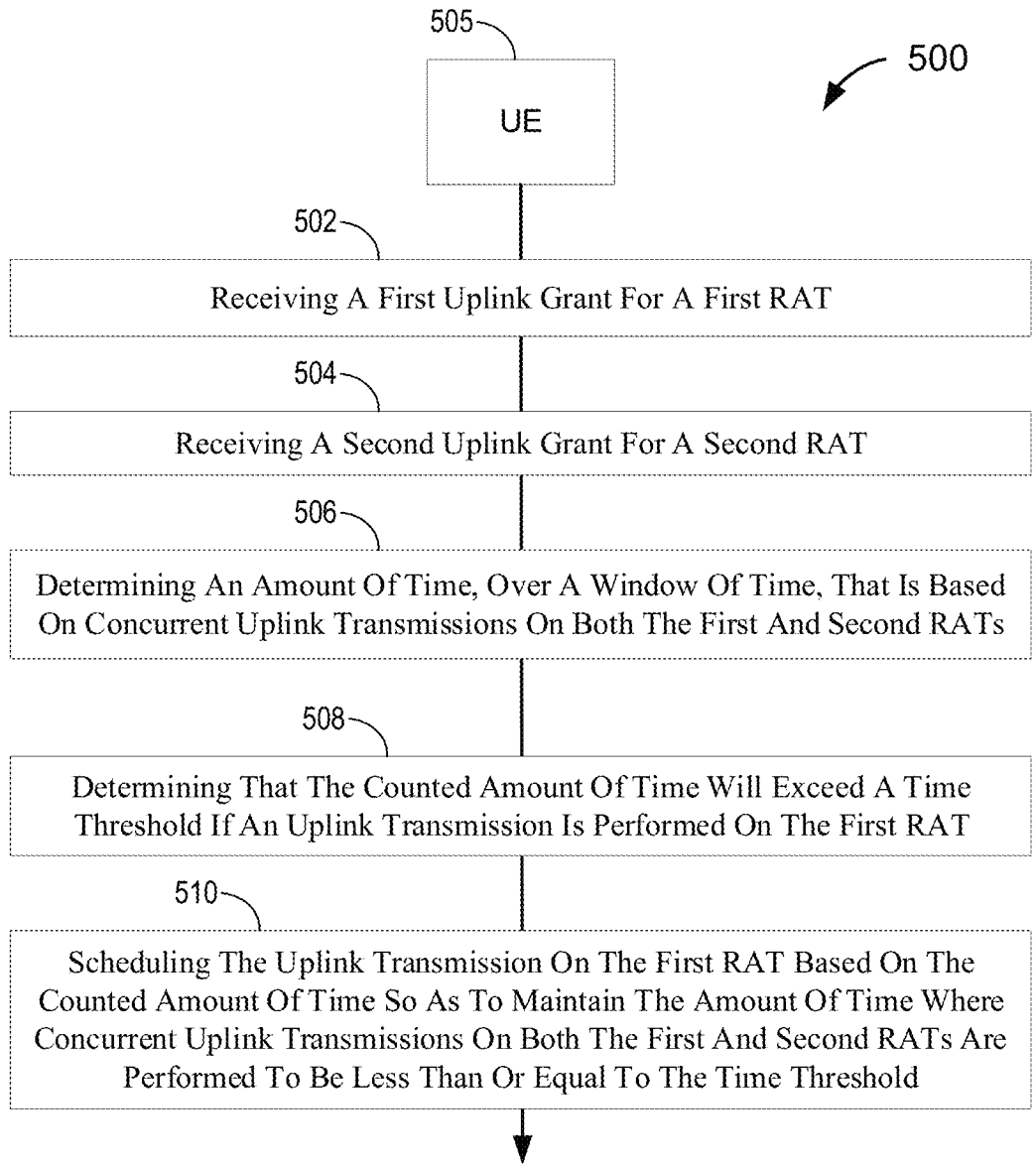
FIG. 5 illustrates an exemplary process of managing concurrent multi-RAT uplink transmissions at a UE.

FIG. 5 illustrates an exemplary process 500 of managing concurrent multi-RAT uplink transmissions at a UE. The process 500 of FIG. 5 is performed by a UE 505, which may correspond to any of the above-noted UEs (e.g., UE 240, 350, etc.).

At 502, the UE 505 (e.g., antenna(s) 352, receiver(s) 354, RX processor 356, etc.) receives a first uplink grant for a first RAT (e.g., 5G NR). At 504, the UE 505 (e.g., antenna(s) 352, receiver(s) 354, RX processor 356, etc.) receives a second uplink grant for a second RAT (e.g., LTE).

At 506, the UE 505 (e.g., controller/processor 359, etc.) determines an amount of time, over a window of time, that is based on concurrent uplink transmissions on both the first and second RATs. In an example, the amount of time corresponds to a time during which the concurrent uplink transmissions on both the first and second RATs are performed (e.g., during a window of time where GNSS communications are performed). In an alternative example, the amount of time may correspond to a time during a victim GNSS is blanked during the window of time (e.g., where the victim GNSS band is blanked in slots where the concurrent uplink transmissions on both the first and second RATs are performed). In either case, the amount of time is based on the concurrent uplink transmissions, irrespective of whether the concurrent uplink transmissions are factored into the amount of time directly or indirectly via the GNSS blanking. In an example, the determination of 506 may be performed by counting the amount of time in particular units of time (e.g., slots, half-slots, etc.). In an example, the window of time may be a moving window of time (e.g., a moving 20 ms window).

At 508, the UE 505 (e.g., controller/processor 359, etc.) determines that the amount of time will exceed a time threshold (e.g., 10 ms) if an uplink transmission is performed on the first RAT (e.g., for scenario where the amount of time is the GNSS blanking time, the determination of 508 assumes that the GNSS will be blanked to account for the first RAT transmission). At 510, the UE 505 (e.g., controller/processor 359, etc.) schedules the uplink transmission on the first RAT based on the amount of time so as to maintain the amount of time where concurrent uplink transmissions on both the first and second RATs are performed to be less than or equal to the time threshold. For example, the scheduling of 510 may include dropping at least a portion of the uplink transmission on the first RAT so as to maintain the amount of time to be less than or equal to the time threshold. In another example, the scheduling of 510 may include blanking one or more GNSS communications without dropping any transmission associated with either the first RAT or the second RAT in the window of time. In yet another example, the scheduling of 510 may include dropping one or more transmissions over a first set of uplink channels on the first RAT while exempting a second set of uplink channels on the second RAT from any transmission drops further exempting any GNSS communications from blanking Referring to FIG. 5, in some designs, the UE 505 blanks the GNSS band during concurrent multi-RAT transmissions which are not dropped. However, in some designs, the process of FIG. 5 will ensure that this blanking does not exceed a critical point (e.g., more than 10 ms over a 20 ms window) where GNSS will fail due to the dropping that occurs at 510.

Referring to FIG. 5, in some designs, the first RAT is 5G NR and the second RAT is LTE. In this case, the scheduled uplink transmissions on the first RAT (5G NR) or the second RAT (LTE) may occur on the Physical Uplink Control Channel (PUCCH) or Physical Uplink Shared Channel (PUSCH). In a further example, the scheduled uplink transmissions on the first RAT may comprise one or more sounding reference signals (SRSs). In some designs, a random access channel (RACH) is not factored as part of the scheduled uplink transmissions on the first RAT (5G NR) or the second RAT (LTE) (e.g., because the RACH is limited in terms of resource blocks, etc.). In other designs, the scheduled uplink transmissions on the first RAT may include RACH transmissions.

Referring to FIG. 5, in an example, 5G NR includes the information noted in Table 1 above, with particular EN-DC band combinations and victim systems (GPS, GLONASS, BDS, Galileo). In some designs, a GNSS indication of the victim system can be provided to the UE 505 (e.g., in real-time) to indicate when a particular victim system is being utilized. Then, if the EN-DC band combination utilized by the first and second RATs interferes with the indicated victim band, 506-508-510 is triggered.

Referring to FIG. 5, in some designs, the determination of 506 counts the amount of time in units of slots, and any concurrent uplink transmissions in any overlapping slots is counted as a complete overlap. In other designs, the determination of 506 counts the amount of time in units shorter than a length of a slot (e.g., a half-slot, etc.) to factor whether any overlapping slots overlap completely or partially.

Referring to FIG. 5, in some designs, a first timing of time slots carrying respective resource blocks on the first RAT being offset from a second timing of time slots carrying respective resource blocks on the second RAT. For example, a scenario may occur where there is 100% scheduling on 5G NR and 50% scheduling on LTE with 0.5 ms offset (e.g., half of a 1 ms slot) between the two. In this case, a count unit of granularity for 506 of FIG. 5 may be a half-slot.

Figure 6A:
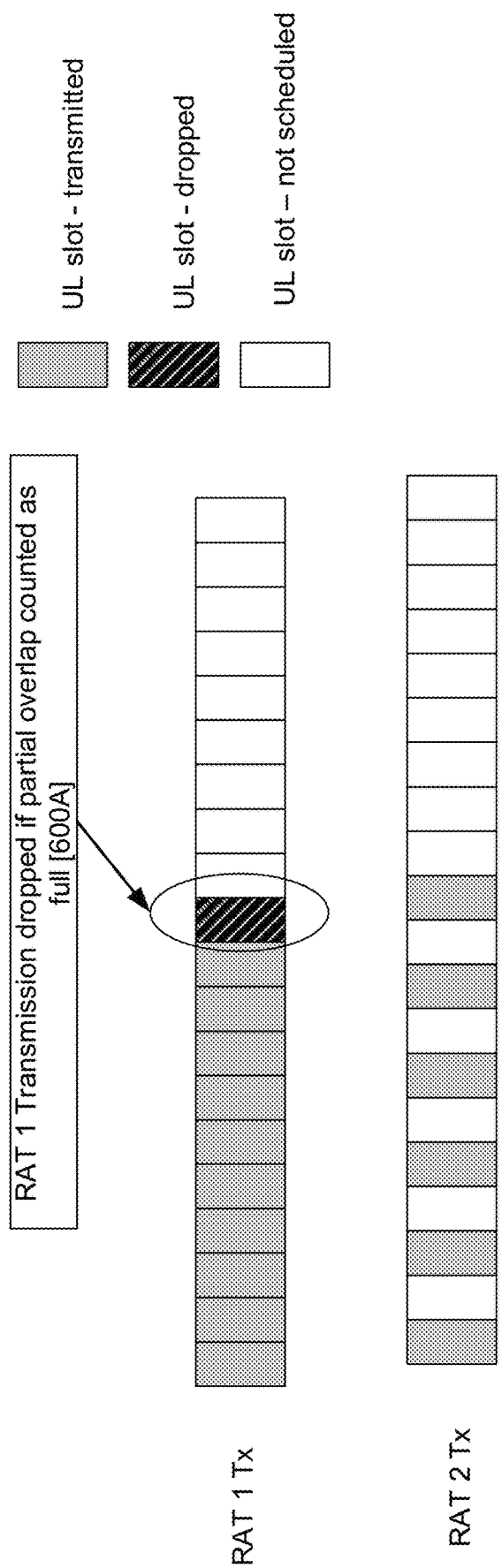
FIGS. 6A-6B illustrate scenarios where timings for radio access technologies (RATs) 1 and 2 are offset from each other by a half-slot.
Figure 6B:
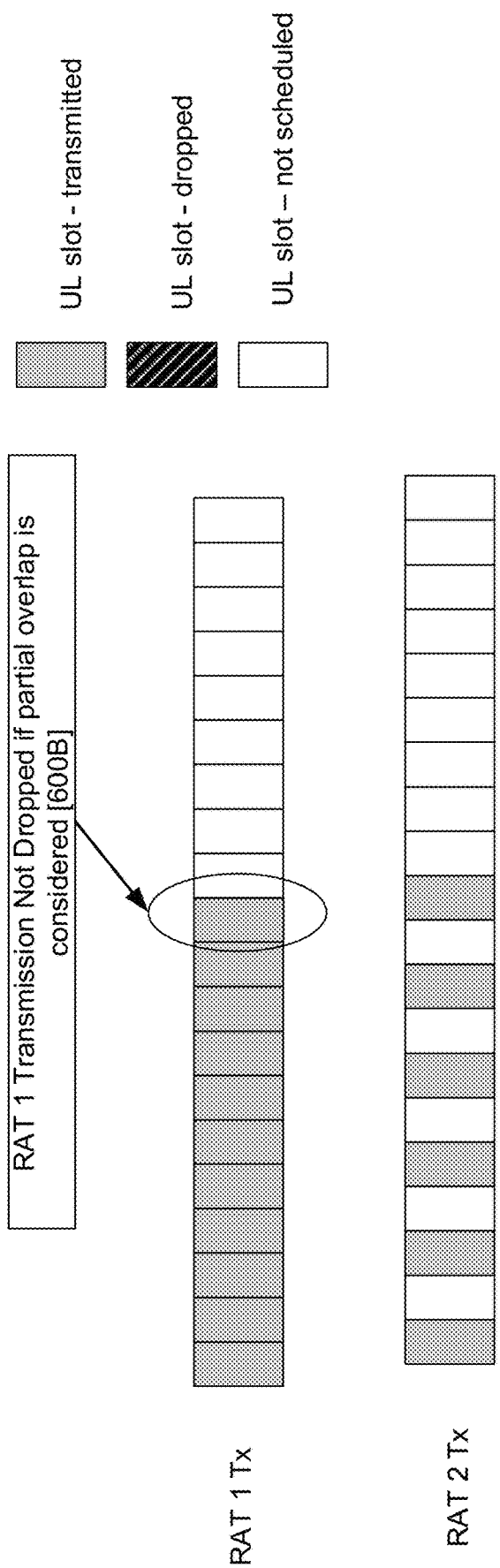

FIGS. 6A-6B illustrate scenarios where timings for RATs 1 and 2 are offset from each other by a half-slot. In FIG. 6A, each partial overlap is counted as a complete overlap (e.g., if only half of a RAT 1 slot overlaps with a RAT 2 transmission, then RAT 1 slot is deemed to completely overlap with RAT 2). This causes the overlap count to increase more quickly, resulting in a dropped RAT 1 transmission at slot 600A. In FIG. 6B, partial overlaps are considered (e.g., if only half of a RAT 1 slot overlaps with a RAT 2 transmission, only half of that RAT 1 slot is deemed to overlap with RAT 2). This causes the overlap count to increase less quickly, such that a RAT 1 transmission at slot 600B (which corresponds to slot 600A of FIG. 6A) is not dropped.

Figure 7A:
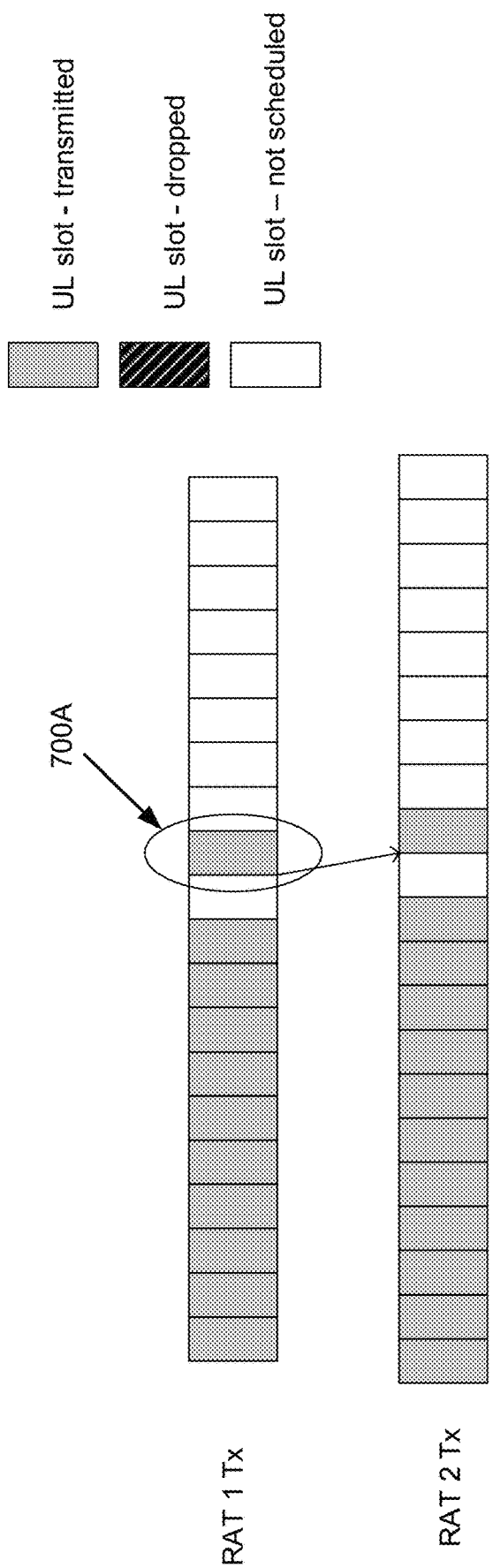
FIGS. 7A-7B illustrate additional scenarios where timings for RATs 1 and 2 are offset from each other by a half-slot.
Figure 7B:
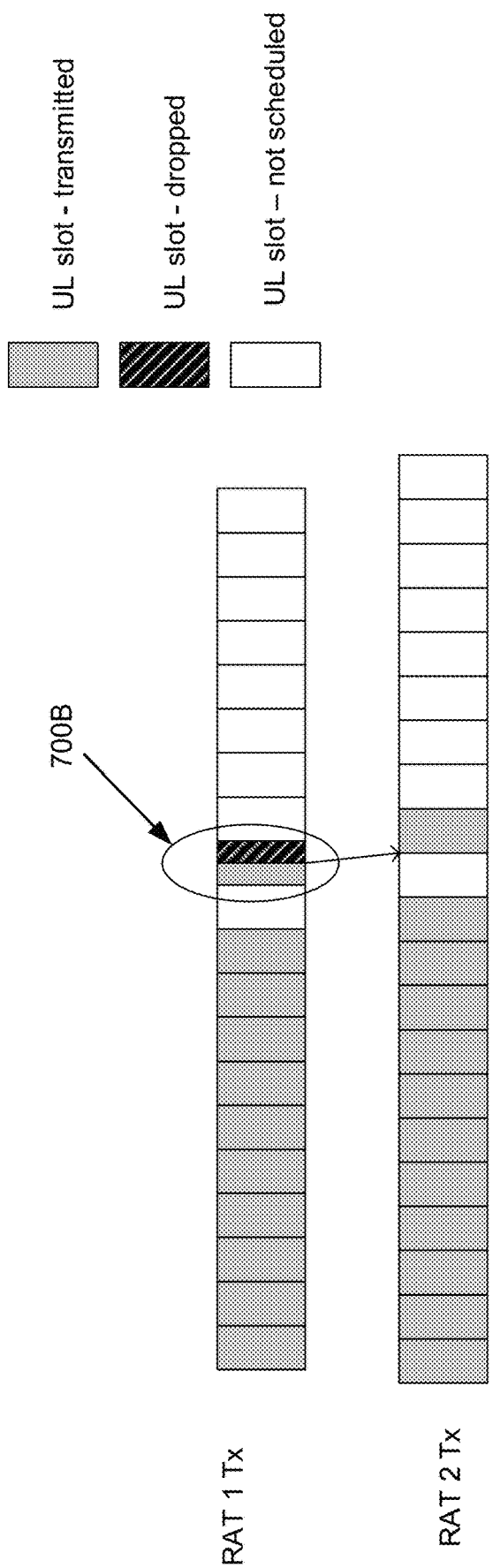

FIGS. 7A-7B illustrate scenarios where timings for RATs 1 and 2 are offset from each other by a half-slot. In FIGS. 7A-7B, it is assumed that RAT 1 is scheduled without knowledge of RAT 2's transmission schedule. As shown in FIG. 7A, RAT 1 begins a transmission at slot 700A, which then overlaps with a RAT 2 transmission starting a half-slot later, at which point the amount of time where concurrent uplink transmissions on both the first and second RATs are scheduled over the window of time is exceeded (e.g., causing IM to impact the GNSS band). In FIG. 7B, an intra-slot transmission drop is implemented. In this case, by counting at partial slot increments (e.g., half-slot), a latter part of a scheduled RAT 1 transmission can be dropped (or cutoff) such that the time threshold for concurrent multi-RAT transmissions is not exceeded, as shown with respect to RAT 1 slot 700B of FIG. 7B (e.g., first half of RAT 1 slot 700B includes the scheduled RAT 1 transmission for that slot, while second half of RAT 1 slot is dropped 700B). In FIG. 7B, the drop decision of 510 of FIG. 5 is made at the symbol level (e.g., at each half-slot) instead of the slot level as in FIGS. 6A-6B.

In some designs, the determination of 506 of FIG. 5 may use a cyclic bitmap of 40 bits (e.g., 2 bits per slot in 20 ms for 15 kHz SCS). In this example, each bit indicates whether there was IM in a half-slot caused by RATs 1 and 2 transmitting concurrently in that half-slot. In a specific example, if RAT 1 corresponding to 5G NR and RAT 2 corresponds to LTE, then an exemplary algorithm for updating the 40-bit cyclic bitmap at each half-slot is as follows:

When 5G NR attempts to schedule a new transmission in a half-slot:
  If the bitmap has 20 1 s or more (without counting a present bit position) and LTE has a concurrent transmission on any symbol of this half-slot:
    drop the new 5G NR transmission, set the present bit position to 0, remove oldest bit position, and do not blank GNSS,
  Else if LTE has a concurrent transmission on any symbol of this half-slot:
    Do not drop the new 5G NR transmission, set the present bit position to 1, remove oldest bit position, and blank GNSS,
  Else:
    Do not drop the new 5G NR transmission, set present bit position to 0, and do not blank GNSS,
When 5G NR does not attempt to schedule a new transmission in a half-slot:
  Set present bit position to 0, and do not blank GNSS, In another specific example, if RAT 1 corresponding to 5G NR and RAT 2 corresponds to LTE, GNSS may be blanked in up to 50% of slots where 5G NR transmits. In the remaining slots, 5G NR tries best effort to transmit, and if LTE overlaps, then 5G NR stops transmitting. In this example, assume that a cyclic bitmap of 20 bits is used (e.g., 1 bit per slot in 20 ms for 15 kHz SCS). Each bit of the 20-bit cycling bitmap indicates whether GNSS was blanked in a respective slot. A 5G NR transmission is blanked if a concurrent LTE transmission is scheduled, and if GNSS blanking exceeds 10 ms in a moving 20 ms window of time. 5G NR transmission dropping is performed intra-slot, whereas GNSS blanking (if used) is performed only once per slot. Under these assumptions, an exemplary algorithm for updating the 20-bit cyclic bitmap at each slot is as follows:

Bitmap bit set to 1 if
  GNSS blanked
GNSS blanked if
  Bitmap does not have 10 1 s in previous 20 positions,
  5G NR transmission scheduled (on a respective half-slot)
  if
  Bitmap does not have 10 1 s in previous 20 positions, or
  Bitmap has 10 1 s in previous 20 positions and no LTE transmission in this half-slot A more detailed version of the above-noted exemplary algorithm for updating the 20-bit cycling bitmap at each slot is as follows:

First half-slot of slot, when 5G NR schedules a transmission:
  If the bitmap has 10 1 s (without counting the present bit position),
    If there is a concurrent LTE transmission (any symbol of this half-slot)
      Drop 5G NR transmission,
    Else
      Continue with 5G NR transmission scheduling
Mid-Slot, when 5G NR schedules a transmission:
  If there is a concurrent LTE transmission (any symbol of this half-slot)
    Drop 5G NR transmission
  Else (5G NR has no transmission)
    Set bit to 0

Figure 7C:
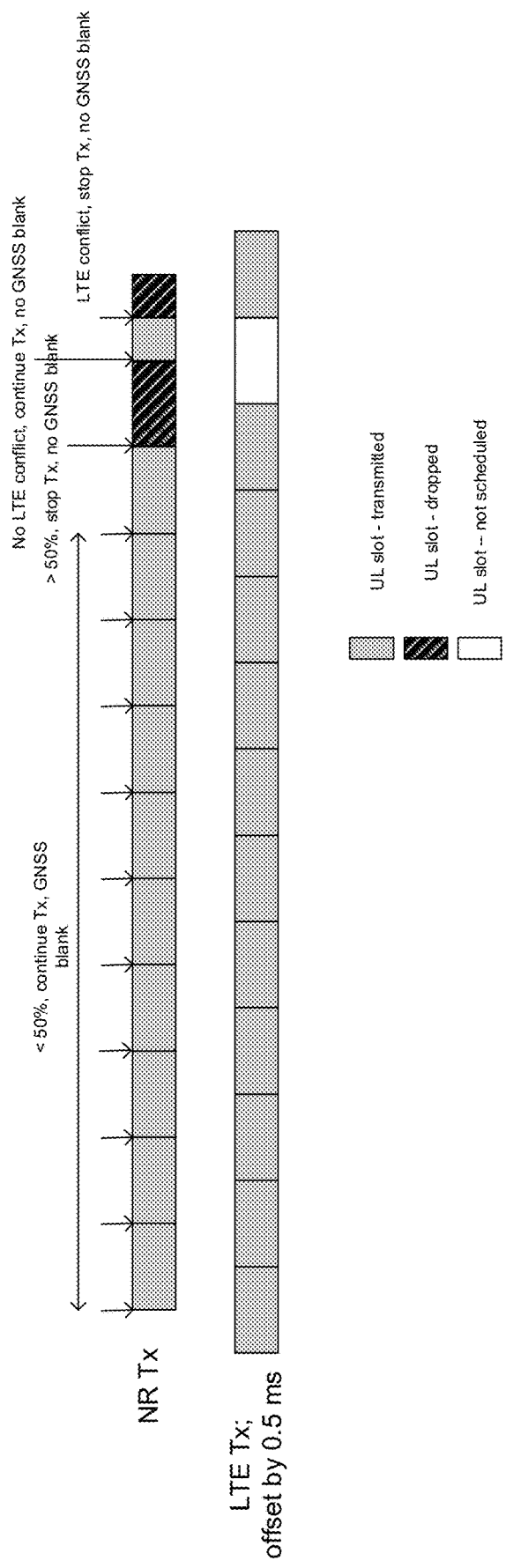
FIGS. 7C-7D illustrate scenarios where timings for RATs 1 and 2 are offset from each other by a half-slot whereby RAT 1 corresponds to 5G NR (or simply NR) and RAT 2 corresponds to LTE.
Figure 7D:
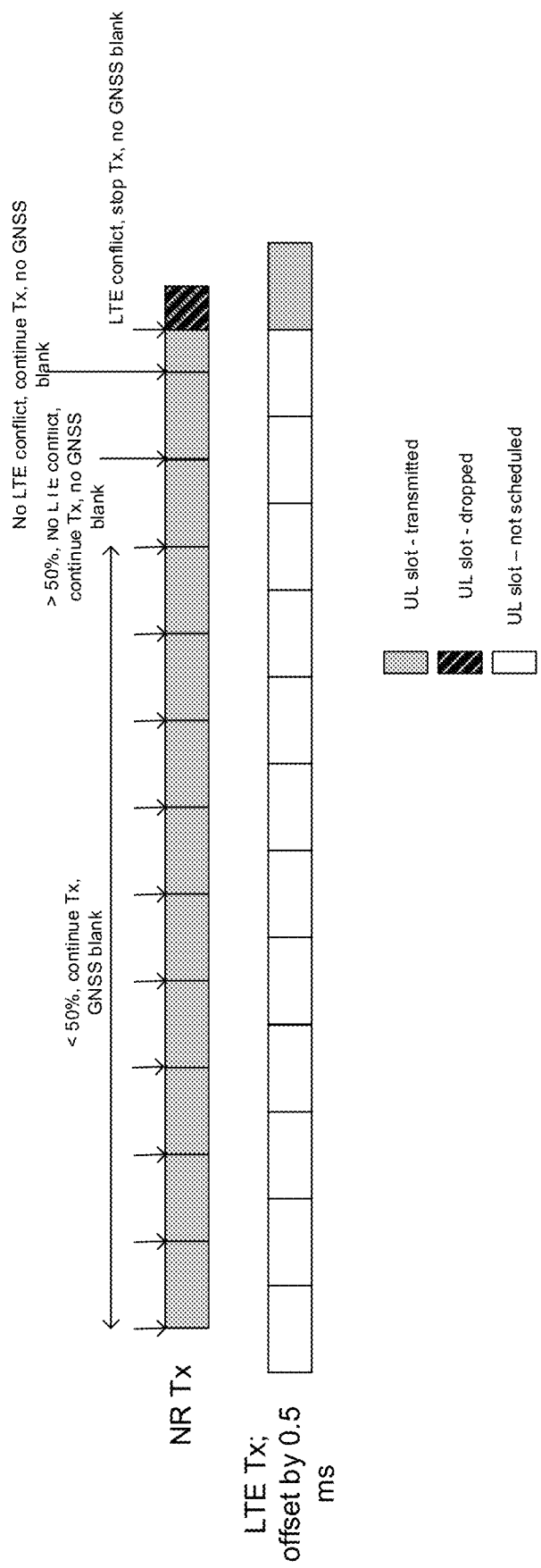

FIGS. 7C-7D illustrate scenarios where timings for RATs 1 and 2 are offset from each other by a half-slot whereby RAT 1 corresponds to 5G NR (or simply NR) and RAT 2 corresponds to LTE. In FIGS. 7C-7D, GNSS is blanked in up to 50% of slots where NR transmits, and NR uses best effort to transmit in any remaining slots (if there is an overlapping LTE transmission that would cause GNSS blanking to exceed 50%, then NR transmission is dropped).

Referring to FIG. 5, in some designs, concurrent multi-RAT transmissions are permitted without the restriction of the time threshold in some scenarios, such as when no victim GNSS band is being utilized. In a further example, even when a victim GNSS band is being utilized, a separate power analysis may be performed before triggering the process of FIG. 5.

In an example, a power threshold beyond which concurrent multi-RAT transmissions cause IM-related problems to particular victim GNSS bands is determined. In some designs, if a total power (e.g., in dBm) for RATs 1 and 2 (e.g., LTE+5G NR) exceeds this power threshold, then the process of FIG. 5 may be executed. In other designs, the total power for RATs 1 and 2 may be regulated in accordance with a power backoff protocol to ensure that the total power is not exceeded. However, if the total power (e.g., in dBm) for RATs 1 and 2 (e.g., LTE+5G NR) does not exceed this power threshold (e.g., in accordance with 'normal' power control protocols or in accordance with a power backoff protocol which lowers the total power below the power threshold), then the process of FIG. 5 is not executed and RATs 1 and 2 are permitted to schedule transmission without regard to their impact to a victim GNSS band. In some designs, if the total power (e.g., in dBm) for RATs 1 and 2 (e.g., LTE+5G NR) exceeds the power threshold, the UE may also fill in the UL grant for RAT 1 with MAC 'padding' so as to avoid loss of data resulting from the power backoff.

In a further example, 506-508-510 of FIG. 5 may be triggered based on one or more conditions. In one specific example, the one or more conditions may include an uplink duty cycle in TDD. For instance, if the uplink duty cycle is greater than a threshold (e.g., 50%, etc.), then the 506-508-510 of FIG. 5 are performed; if not, transmissions may be permitted on the first RAT without dropping any associated packets.

While FIGS. 5-7B are generally directed to selective dropping of scheduled uplink transmission on a particular RAT (e.g., 5G NR), further embodiments are directed to reducing a number of drops via buffer status report (BSR) management. For example, reducing the number of drops to scheduled transmissions will result in less HARQ loss and RLC level recovery. Also, for split bearers, data can be sent on RAT 2 (e.g., LTE) instead of being stuck in a 5G NR HARQ that experiences a high number of drops.

In some designs, a BSR is used to indicate an amount of UL data for transmission over 5G NR. The BSR reports only enough data so as to achieve a target data rate, R, in a time period defined as a transmit period (e.g., an amount of time at which the traffic volume specified by the BSR would be drained at target data rate R). In some designs cooldown period $T\_c$ in which no BSR is reported, and padding is sent. For an initial BSR, $IR=T\_c * R$ (e.g., so as to drain the original amount of data during $T\_c$). After this initial period, the BSR is updated by $BSR(t)=BSR(t-1)-Grant(t-1)+R*TTI$ (e.g., so as to drain the original amount of data minus previous grant plus data accumulated during 1 TTI).

Figure 8:
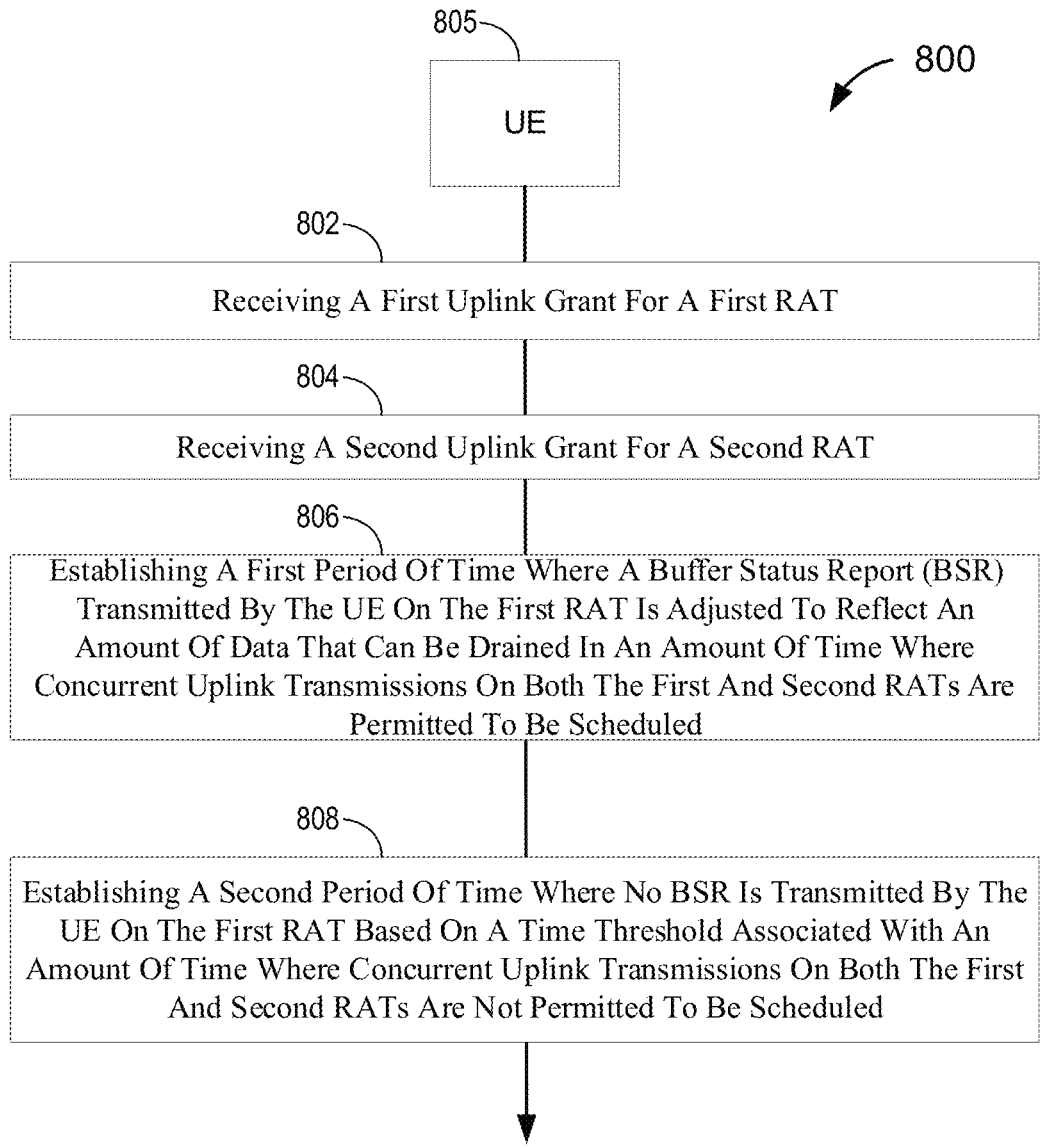
FIG. 8 illustrates another exemplary process of managing concurrent multi-RAT uplink transmissions at a UE.

FIG. 8 illustrates an exemplary process 800 of managing concurrent multi-RAT uplink transmissions at a UE. The process 800 of FIG. 8 is performed by a UE 805, which may correspond to any of the above-noted UEs (e.g., UE 240, 350, etc.).

At 802, the UE 805 (e.g., antenna(s) 352, receiver(s) 354, RX processor 356, etc.) receives a first uplink grant for a first RAT (e.g., 5G NR). At 804, the UE 805 (e.g., antenna(s) 352, receiver(s) 354, RX processor 356, etc.) receives a second uplink grant for a second RAT (e.g., LTE). At 806, the UE 805 (e.g., controller/processor 359, etc.) establishes a first period of time where a buffer status report (BSR) transmitted by the UE on the first RAT is adjusted to reflect an amount of data that can be drained in an amount of time (e.g., no more than 10 ms over a 20 ms window) where concurrent uplink transmissions on both the first and second RATs are permitted to be scheduled. At 808, the UE 805 (e.g., controller/processor 359, etc.) establishes a second period of time where no BSR is transmitted by the UE on the first RAT based on a time threshold (e.g., 10 ms) associated with an amount of time (e.g., no more than 10 ms over a 20 ms window) where concurrent uplink transmissions on both the first and second RATs are not permitted to be scheduled. As used herein, no BSR being reported or transmitted refers to a scenario where the BSR is not transmitted at all, or alternatively to a scenario where the BSR indicating a traffic volume of zero is transmitted.

An example implementation of the process of FIG. 8 will now be described specific to a 15 kHz numerology whereby the first RAT is 5G NR and the second RAT is LTE. In this example, $T\_c=10$ ms, and $IR=10$ ms * R. At every slot, $BSR(t)=BSR(t-1)-Grant(t-1)+R*1$ ms. For all logical channel groups (LCGs) reported on 5G NR:

Split bearer (e.g., a bearer which is transmitted and received via both the master and secondary base stations): scale (or adjust) 5G NR BSR, Secondary cell group (SCG) bearer (or split bearer) configured to send only on NR: scale (or adjust) 5G NR BSR only if LTE BSR is non-zero or never scale for simplicity.

For example, the adjustment of 806 may be done only for BSR associated with a split bearer. In another example, the adjustment of 806 may be done for SCG bearer or split bearer configured to send only on NR if the BSR reported on the second RAT is non-zero. In some designs, for 5G NR standalone (SA) mode, if the component carriers utilized by PCell and SCell(s) cause IM to a victim GNSS band, then the UE can implement a process similar to the process of FIG. 5. So, the UE can count the concurrent NR PCell and SCell transmissions in a window of time (e.g., 20 ms), and then drop SCell transmissions so as to permit a defined amount of IM-free time (e.g., 10 ms or more, or at least 50% of IM-free time) for the victim GNSS band. In a further example, emergency call positioning in 5G NR SA mode may be similar to LTE (e.g., SCell UL transmissions dropped if concurrent with PCell UL transmissions).

In further designs, additional optimizations can be implemented beyond selective dropping of scheduled 5G NR uplink transmissions. In one example, scheduled LTE uplink transmissions can be blanked preemptively in order to grant a higher priority to scheduled 5G NR uplink transmissions (e.g., to reduce drops to 5G NR). In another example, certain higher priority 5G NR traffic can be exempted from drops. For example, PUCCH carrying HARQ feedback on 5G NR can be exempted, with LTE traffic being dropped instead if necessary to protect the victim GNSS band pursuant to the process of FIG. 5. In a more specific example, only a PUCCH allocated a number of resource blocks falling below a threshold number of resource blocks is exempted, while a PUCCH including at least the threshold number of resources blocks and/or one or more other non-PUCCH uplink channels are not exempted. In a further example, the UE can check for exact resource blocks in the UL grant if it causes IM(e.g., define overlap more precisely in terms of both frequency and time instead of time only). In a further example, for an emergency call where GNSS is needed, a rule can be implemented whereby only concurrent 5G NR uplink transmissions are dropped. In a further example, a mini-slot could be implemented whereby scheduling is possible in fewer than 14 symbols. In such an implementation, partial slot counting at a finer granularity (e.g., fewer than 7 symbols, or a normal 'half-slot') can be implemented.

In further designs, a GNSS requirement may be defined for particular higher-priority calls, such as emergency calls which may be conducted over LTE. In this case, if a UE is using EN-DC on IM band combinations, an emergency call handling protocol may be implemented. For example, any scheduled uplink transmissions on 5G NR that are concurrent with transmissions on LTE while the emergency call is active are dropped. Alternatively, the 5G NR may be released (e.g., SCG failure) to prevent any IM interference to GNSS. Alternatively, a lower time threshold can be used during the emergency call (e.g., 5 ms instead of 10 ms, etc.) so that more 5G NR SCell transmissions are dropped without requiring all 5G NR uplink transmissions to be dropped. Similarly, in 5G NR SA mode and an emergency call is being conducted, any SCell UL transmissions that are concurrent transmissions with PCell UL transmissions may be dropped. Alternatively, a lower time threshold can be used during the emergency call (e.g., 5 ms instead of 10 ms, etc.) so that more SCell UL transmissions are dropped without requiring all SCell UL transmissions to be dropped.

In further designs, the various operations described above with respect to FIGS. 5 and 8 may be implemented via various "means", such as particular hardware components of the associated UEs 505 and 805. For example, means for performing the receiving aspects of 502, 504, 802 and 804 may correspond to any combination of receiver-related circuitry on the respective UEs, such as antenna(s) 352, receiver(s) 354, RX processor 356, etc. of UE 350 of FIG. 3A. In a further example, means for performing the determining, scheduling and establishing aspects of 506, 508, 806 and 808 may corresponding to any combination of processor-related circuitry on the respective UEs, such as controller/processor 359 of UE 350 of FIG. 3A.

While some of the embodiments are described above with respect to EN-DC mode, the various embodiments of the disclosure are also applicable with respect to other types of dual connectivity modes, such as such as NR-NR NR-LTE, etc. Moreover, while some of the embodiments are described with respect to specific numerologies (e.g., 15 kHz SCS), other embodiments may be directed to implementations whereby different numerologies are used (e.g., 30 kHz SCS, 60 kHz SCS, 120 kHz SCS, 240 kHz SCS, 480 kHz SCS, etc.).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A user equipment (UE), comprising:
   a memory;
   at least one transceiver; and
   at least one processor coupled to the memory and the at least one transceiver and configured to:
      receive a first uplink grant for a first radio access technology (RAT);
      receive a second uplink grant for a second RAT;
      determine an amount of time, over a window of time, that is based on concurrent uplink transmissions on both the first and second RATs;
      determine that the amount of time will exceed a time threshold if an uplink transmission is performed on the first RAT; and
      schedule the uplink transmission on the first RAT based on the amount of time so as to maintain the amount of time where concurrent uplink transmissions on both the first and second RATs are performed to be less than or equal to the time threshold.

2. The UE of claim 1,
   wherein the amount of time corresponds to a time during which communications on a victim Navigation Satellite System (GNSS) band are blanked during the window of time, or
   wherein the amount of time corresponds to a time during which the concurrent uplink transmissions on both the first and second RATs are performed.

3. The UE of claim 2, wherein the at least one processor blanks the victim GNSS band is blanked in slots where the concurrent uplink transmissions on both the first and second RATs are performed.

4. The UE of claim 1,
   wherein the amount of time is based on a time overlap of resource blocks allocated to the concurrent uplink transmissions on the first and second RATs, or
   wherein the amount of time is based on a time and frequency overlap of resource blocks allocated to the concurrent uplink transmissions on the first and second RATs.

5. The UE of claim 1, wherein the at least one processor maintains the amount of time where concurrent uplink transmissions on both the first and second RATs are performed to be less than or equal to the time threshold by dropping one or more transmissions over a first set of uplink channels on the first RAT while exempting a second set of uplink channels from any transmission drops.

6. The UE of claim 5,
   wherein the second set of uplink channels includes a physical uplink control channel (PUCCH), or
   wherein the second set of uplink channels includes a PUCCH allocated a number of resource blocks that is less than a threshold.

7. The UE of claim 1,
   wherein the at least one processor is further configured to determine that a higher-priority communication session is being supported over the second RAT,
   wherein the at least one processor is further configured to (i) drop uplink transmissions on the first RAT so long as the higher-priority communication session is supported over the second RAT, or (ii) drop the first RAT so long as the higher-priority communication session is supported over the second RAT.

8. The UE of claim 1,
   wherein the at least one processor is further configured to determine the amount of time in units of slots, and any concurrent uplink transmissions in any overlapping slots is determined as a complete overlap, or
   wherein the at least one processor is further configured to determine the amount of time in units shorter than a length of a slot to factor whether any overlapping slots overlap completely or partially.

9. The UE of claim 1,
   wherein a first timing of time slots carrying respective resource blocks on the first RAT being offset from a second timing of time slots carrying respective resource blocks on the second RAT,
   wherein the at least one processor is further configured to determine the amount of time in units shorter than a length of a slot,
   wherein the at least one processor is further configured to determine that the amount of time will exceed the time threshold if the uplink transmission which has already begun transmission on a given slot of the first RAT is completed, and
   wherein the at least one processor is further configured to drop some or all of a remainder of the uplink transmission on the given slot of the first RAT so as to maintain the amount of time to be less than or equal to the time threshold.

10. The UE of claim 1,
    wherein the at least one processor is further configured to determine that concurrent uplink transmissions on both the first and second RATs are being scheduled in association with a total power that exceeds a power threshold, and
    wherein the at least one processor is further configured to schedule the uplink transmission on the first RAT in response to the power determination.

11. The UE of claim 1, further comprising:
    wherein the at least one processor is further configured to determine that the first RAT is operating in accordance with time division duplex (TDD) with an uplink duty cycle that is greater than a threshold,
    wherein the at least one processor is further configured to schedule the uplink transmission on the first RAT in response to the duty cycle determination.

12. The UE of claim 1, further comprising:
    wherein the at least one processor is further configured to determine that concurrent uplink transmissions on both the first and second RATs are scheduled in association with a total power that exceeds a power threshold; and wherein the at least one processor is further configured to implement a power backoff to one or more of the concurrent uplink transmissions such that the total power is maintained at less than or equal to the power threshold.

13. The UE of claim 1, wherein the first RAT is 5G New Radio (NR), and wherein the second RAT is Long Term Evolution (LTE).

14. A user equipment (UE), comprising:

a memory;

at least one transceiver; and at least one processor coupled to the memory and the at least one transceiver and configured to:

receive a first uplink grant for a first radio access technology (RAT);

receive a second uplink grant for a second RAT;

establish a first period of time where a buffer status report (BSR) transmitted by the UE on the first RAT is adjusted to reflect an amount of data that can be drained in an amount of time where concurrent uplink transmissions on both the first and second RATs are permitted to be scheduled; and establish a second period of time where no BSR is transmitted by the UE on the first RAT based on a time threshold associated with an amount of time where concurrent uplink transmissions on both the first and second RATs are not permitted to be scheduled.

15. The UE of claim 14, further comprising:

wherein the at least one processor is further configured to determine that the BSR on the first RAT is associated with a split bearer, and wherein the at least one processor is further configured to establish the first period of time responsive to the determination.

16. The UE of claim 14, further comprising:

wherein the at least one processor is further configured to determine that the first uplink grant on the first RAT is associated with a secondary cell group (SCG) bearer or split bearer configured to send only on the first RAT and that a BSR reported on the second RAT is non-zero, wherein the at least one processor is further configured to establish the first period of time responsive to the determination.

17. The UE of claim 14, wherein the first RAT is 5G New Radio (NR), and wherein the second RAT is Long Term Evolution (LTE).

18. A method of operating a user equipment (UE), comprising:

receiving a first uplink grant for a first radio access technology (RAT);

receiving a second uplink grant for a second RAT;

determining an amount of time, over a window of time, that is based on concurrent uplink transmissions on both the first and second RATs;

determining that the amount of time will exceed a time threshold if an uplink transmission is performed on the first RAT; and scheduling the uplink transmission on the first RAT based on the amount of time so as to maintain the amount of time where concurrent uplink transmissions on both the first and second RATs are performed to be less than or equal to the time threshold.

19. The method of claim 18, wherein the amount of time corresponds to a time during which communications on a victim Navigation Satellite System (GNSS) band are blanked during the window of time, or wherein the amount of time corresponds to a time during which the concurrent uplink transmissions on both the first and second RATs are performed.

20. The method of claim 19, wherein the victim GNSS band is blanked in slots where the concurrent uplink transmissions on both the first and second RATs are performed.

21. The method of claim 18, wherein the amount of time is based on a time overlap of resource blocks allocated to the concurrent uplink transmissions on the first and second RATs, or wherein the amount of time is based on a time and frequency overlap of resource blocks allocated to the concurrent uplink transmissions on the first and second RATs.

22. The method of claim 18, wherein the scheduling drops one or more transmissions over a first set of uplink channels on the first RAT while exempting a second set of uplink channels on the second RAT from any transmission drops.

23. The method of claim 22, wherein the second set of uplink channels includes a physical uplink control channel (PUCCH), or wherein the second set of uplink channels includes a PUCCH allocated a number of resource blocks that is less than a threshold.

24. The method of claim 18, determining that a higher-priority communication session is being supported over the second RAT, wherein the scheduling drops one or more uplink transmissions on the first RAT so long as the higher-priority communication session is supported over the second RAT, or wherein the scheduling drops the first RAT so long as the higher-priority communication session is supported over the second RAT.

25. The method of claim 18, wherein the determining the amount of time determines the amount of time in units of slots, and any concurrent uplink transmissions in any overlapping slots is determined as a complete overlap, or wherein the determining determines the amount of time in units shorter than a length of a slot to factor whether any overlapping slots overlap completely or partially.

26. The method of claim 18, wherein a first timing of time slots carrying respective resource blocks on the first RAT being offset from a second timing of time slots carrying respective resource blocks on the second RAT, wherein the determining the amount of time determines the amount of time in units shorter than a length of a slot, wherein the determining that the amount of time will exceed the time threshold if the uplink transmission which has already begun transmission on a given slot of the first RAT is completed, and wherein the scheduling drops some or all of a remainder of the uplink transmission on the given slot of the first RAT so as to maintain the amount of time to be less than or equal to the time threshold.

27. A method of operating a user equipment (UE), comprising:
- receiving a first uplink grant for a first radio access technology (RAT);
- receiving a second uplink grant for a second RAT;
- establishing a first period of time where a buffer status report (BSR) transmitted by the UE on the first RAT is adjusted to reflect an amount of data that can be drained in an amount of time where concurrent uplink transmissions on both the first and second RATs are permitted to be scheduled; and
- establishing a second period of time where no BSR is transmitted by the UE on the first RAT based on a time threshold associated with an amount of time where concurrent uplink transmissions on both the first and second RATs are not permitted to be scheduled.

28. The method of claim 27, further comprising:
- determining that the BSR on the first RAT is associated with a split bearer, and
- wherein the establishing of the first period of time is performed responsive to the determination.

29. The method of claim 27, further comprising:
- determining that the BSR on the first RAT is associated with a secondary cell group (SCG) bearer or split bearer configured to send only on the first RAT and that a BSR reported on the second RAT is non-zero,
- wherein the establishing of the first period of time is performed responsive to the determination.

30. The method of claim 27,
- wherein the first RAT is 5G New Radio (NR), and
- wherein the second RAT is Long Term Evolution (LTE).

* * * * *